United States Patent [19]

Anderson et al.

[11] Patent Number: 4,712,329
[45] Date of Patent: Dec. 15, 1987

[54] LIDDED NURSERY PLANT CONTAINER

[76] Inventors: George C. Anderson, 2425 SE. Moores St., Portland, Oreg. 97222; Richard J. Paul, 8655 SE. Revenue Rd., Boring, Oreg. 97009

[21] Appl. No.: 821,465

[22] Filed: Jan. 22, 1986

[51] Int. Cl.$^4$ .............................................. A01G 9/02
[52] U.S. Cl. ........................................ 47/84; 220/345
[58] Field of Search .................. 47/25, 32, 84, 40.5, 47/41.11, 9; 220/345, 346, 315, 360, 361

[56] References Cited

U.S. PATENT DOCUMENTS

| | | |
|---|---|---|
| D. 235,364 | 6/1975 | Fassauer . |
| 915,897 | 3/1909 | Skorness ............................. 47/32 |
| 1,130,545 | 3/1915 | Scott ................................ 47/25 X |
| 1,534,508 | 4/1925 | Thomas . |
| 1,873,693 | 8/1932 | Whitfield et al. ............. 47/41.11 X |
| 2,011,406 | 8/1935 | Heltner et al. ..................... 220/346 |
| 2,785,508 | 3/1957 | Coleman, Jr. . |
| 2,790,269 | 4/1957 | Coleman, Jr. . |
| 2,844,288 | 7/1958 | Crowley ........................ 220/345 X |
| 3,153,301 | 10/1964 | Redyke . |
| 3,475,858 | 11/1969 | Flannigan . |
| 3,571,972 | 3/1971 | Carter ................................ 47/25 |
| 3,699,730 | 10/1972 | Humphrey ...................... 220/315 X |
| 3,891,423 | 6/1975 | Stanley et al. ................... 47/32 X |
| 3,940,884 | 3/1976 | Mason ................................. 47/32 |
| 3,961,443 | 6/1976 | Insalaco . |
| 4,209,092 | 6/1980 | Jones . |
| 4,336,669 | 5/1982 | Gordon . |
| 4,369,598 | 1/1983 | Beckwith . |
| 4,395,845 | 8/1983 | Markowitz . |
| 4,403,443 | 9/1983 | Valente ................................ 47/32 |
| 4,475,654 | 10/1984 | Fruchter ........................ 220/345 X |

FOREIGN PATENT DOCUMENTS

| | | |
|---|---|---|
| 286894 | 4/1914 | Fed. Rep. of Germany ...... 220/345 |
| 1496503 | 8/1967 | France ................................. 47/32 |
| 588841 | 2/1959 | Italy ..................................... 47/32 |
| 112662 | 1/1918 | United Kingdom ................. 47/32 |

Primary Examiner—Robert A. Hafer
Assistant Examiner—Danton D. DeMille
Attorney, Agent, or Firm—Eugene D. Farley

[57] ABSTRACT

A lidded container for growing, transporting and storing nursery plants. The container assembly comprises in combination an open-topped container dimensioned to receive the root structure of a plant and a lid which fits within the open top of the container. The lid has a central opening dimensioned to receive the stem or trunk of a plant and a radial slot of predetermined width communicating the opening with the exterior. A slide block or other closure is mountable in the slot. It slidably engages the slot margins when the lid is in its operative position, closing the open top of the container. Frictional interengaging means, such as a plurality of parallel, closely-spaced ribs on the upper inner margin of the container, releasably maintains the top in the closed condition of the container.

2 Claims, 4 Drawing Figures

LIDDED NURSERY PLANT CONTAINER

BACKGROUND AND GENERAL STATEMENT OF THE INVENTION

This invention pertains to lidded nursery plant containers in which the plants may be grown, stored, transported and merchandised.

For the sake of convenience and efficiency, it is common present day practice to grow, store, transport and merchandise nursery shrubs and trees in containers of appropriate size and character. Historically, nurseries first placed or grew their plants in metal containers which were discards from the canned food industry. Hence the size identification of plants (1 gallon, 2 gallon, etc.) in terms of the size of the container in which they were contained. With the development of the plastics industry, plastic containers designed especially for use with nursery plants now have become available at reasonable cost.

Small shrubs can be grown in the containers in which they are to be merchandised. On the commercial scale, however, trees must be field grown and then transferred to containers when they are ready for market. They may be transferred either bare root, or after having been balled and burlapped.

After transfer, the bare-rooted plants become reestablished in the containers. This greatly increases their viability and provides a year around market.

Transferring bare-rooted trees to containers presents serious problems and creates extra costs for the nurseryman:

After the trees have been transferred to containers, they must be established for one growing season with attendant loss of time in merchandising them.

During establishment of the trees in the container, the root systems must be supported by stakes until the new roots have been established. Presence of the stakes inhibits caliper growth of the trees, damages the tree trunks, and causes irregular trunk growth.

Even when the trees have been established in the containers, they still are difficult to truck-transport since road vibrations loosen the growing medium and dislodge the trees. To minimize this problem, it is common practice to load the trees in the transporting truck in upright position. This limits the pay load correspondingly.

It accordingly is the general purpose of the present invention to provide a lidded nursery plant container for storing, transporting and merchandising nursery plants, particularly trees, which firmly compresses and holds the root systems of the contained plants, holding the trees straight while still allowing the trunk movement required for caliper growth thereby making the containers an integral part of the plant support systems and eliminating the need for staking.

It is a further important object of the present invention to provide a lidded nursery plant container particularly suited for handling and merchandising bare root fruit trees which secures and anchors the root systems in place so that the trees establish themselves efficiently in the containers and may be sold at any time during the calendar year.

Other objects and advantages of the present invention are the provision of a lidded nursery plant container which provides quicker establishment and anchoring of the root system; which permits shipping bare root trees immediately after containerization; which protects the plant root balls from being crushed in transit; which promotes even distribution of irrigation water throughout the root zone; which reduces evaporative moisture loss by as much as 50%; which permits stacking of the plants in the transport vehicle; which permits plant irrigation during storage and transport; which provides weed control in the planting medium; which facilitates handling by the nurseryman, the transport employees, the merchandising personnel and the purchasers; and which enhances the living Christmas tree market.

As fully set forth in the drawings and description which follow, the foregoing and other objects and purposes of the present invention are achieved by the provision of a lidded nursery plant container which, broadly stated, comprises in combination an open-topped container for receiving the root structure of a plant, and a lid dimensioned to fit within the open top of the container. The lid is characterized by the presence of, first, a central opening dimensioned to receive the stem or trunk of the plant and, second, a radial slot of predetermined width communicating the opening with the exterior.

A slide block is mountable slidably in the slot. It slidably engages the margins of the slot when the lid is in its operative position, closing the open top of the container.

Parallel, closely spaced ribs on the upper, inner margin of the container frictionally interengage the lid with the container. A plurality of spaced irrigation openings in the lid permit ventilation and watering of the plant roots as required.

THE DRAWINGS

DESCRIPTION OF A SPECIFIC EMBODIMENT OF THE INVENTION

Figure 1:
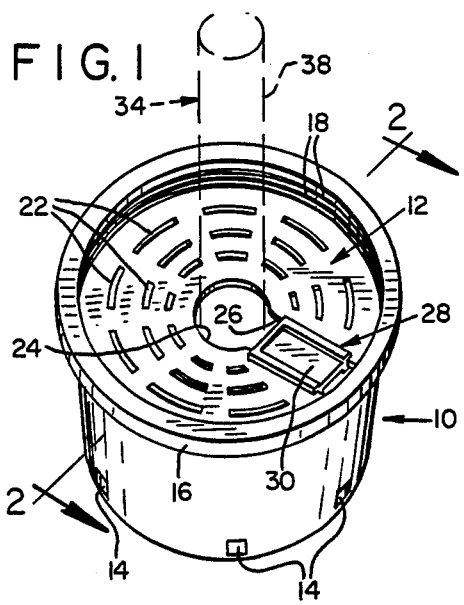
FIG. 1 is a top perspective view of the herein described lidded nursery plant container.

As illustrated in the drawings, the lidded nursery plant container of my invention comprises in combination a container, indicated generally at 10, with associated lid, indicated generally at 12.

Container 10 preferably is fabricated from an inexpensive plastic of substantial strength. The container side walls taper inwardly in the downward direction. They are provided with drain openings 14 along the bottom margin.

The open top of the container is defined by a reversely bent, stiffening flange 16, which promotes easy handling The inner, upper margin of the container is formed with a plurality of parallel, closely spaced ribs 18. These provide releasable frictional means for interengaging the inner surface of the container with the outer edge of lid 12.

Lid 12 also preferably is fabricated from a strong, relatively inexpensive, flexible plastic material. It is dimensioned so that its outer edge will engage friction ribs 18 in releasable engagement when the lid is pushed down into the tapered, open, upper end of the container.

Lid 12 is provided with a plurality of spaced stiffening ribs 20 and a plurality of spaced irrigation perforations 22.

The lid further is characterized by the presence of a central opening 24. The diameter of opening 24 is sufficient to accommodate the stem or trunk of a plant contained in the container. Sufficient clearance should be provided to prevent injury to the plant. However, it is the intent to restrict the clearance in a manner calculated to maintain the plant upright in the container.

A radial slot 26 communicates opening 24 with the exterior.

Closure means are provided for closing slot 26 in the operative position of the lid, thereby stiffening the lid further and assisting in preserving its function of maintaining the plant upright in the container.

In the illustrated form of the invention, the closure means comprises a slide block indicated generally at 28, and comprising a flat member made of plastic, wood, or other suitable structural material. The block is sufficiently wide to span the distance between the side margins of slot 26 and of sufficient length to substantially fill the length of the slot.

The body of the block 30 is flat and substantially coplanar with the surfaces of lid 12.

The longitudinal side margins of the block are provided with grooves 32 dimensioned to receive the defining margins of slot 26 in lid 12. The slot thus provides a guideway or track slidably receiving block 28.

Figure 3:
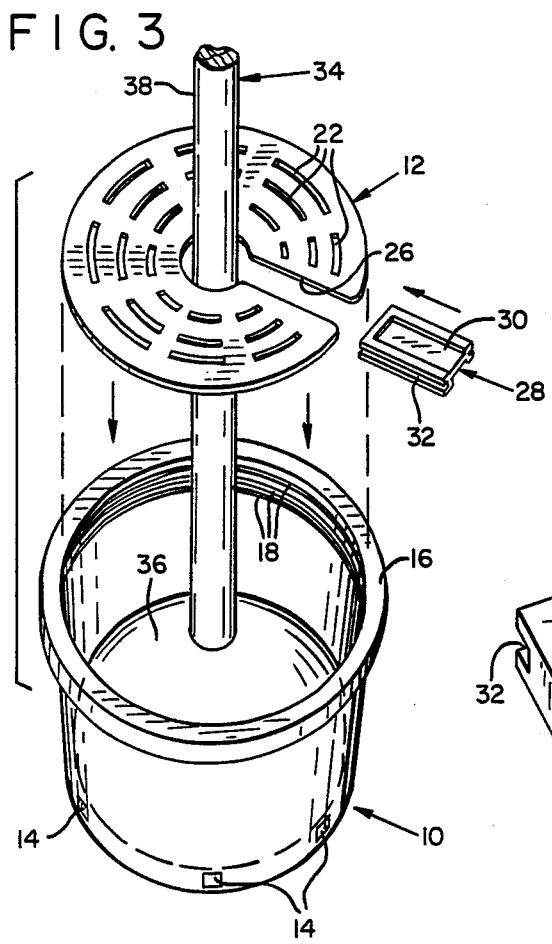
FIG. 3 is an exploded perspective view of the container assembly.
Figure 4:
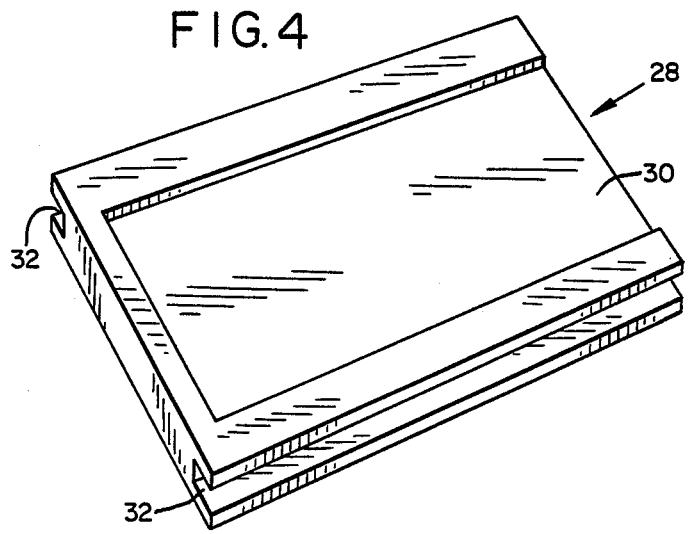
FIG. 4 is a top perspective view of a slide closure block which is a component of the container assembly.

The block is entirely removable from the guideway when it is desired to load the plant into the container and apply the lid, as indicated in FIG. 3. However in the use position of the assembly, the block assumes its FIG. 1 position interconnecting the two free edges of the lid, integrating and stiffening the entire assembly.

Operation

The lidded nursery plant container of my invention may be used to contain either bare root plants or plants which have been balled and burlapped. If they are used to contain bare root plants, the roots and lower portion of the trunk are placed in the container and packed with the growing medium. If the container is applied to balled and burlapped plants, the balled and burlapped portion of the plant is inserted in the container and packed with sawdust, or other suitable filler.

Figure 2:
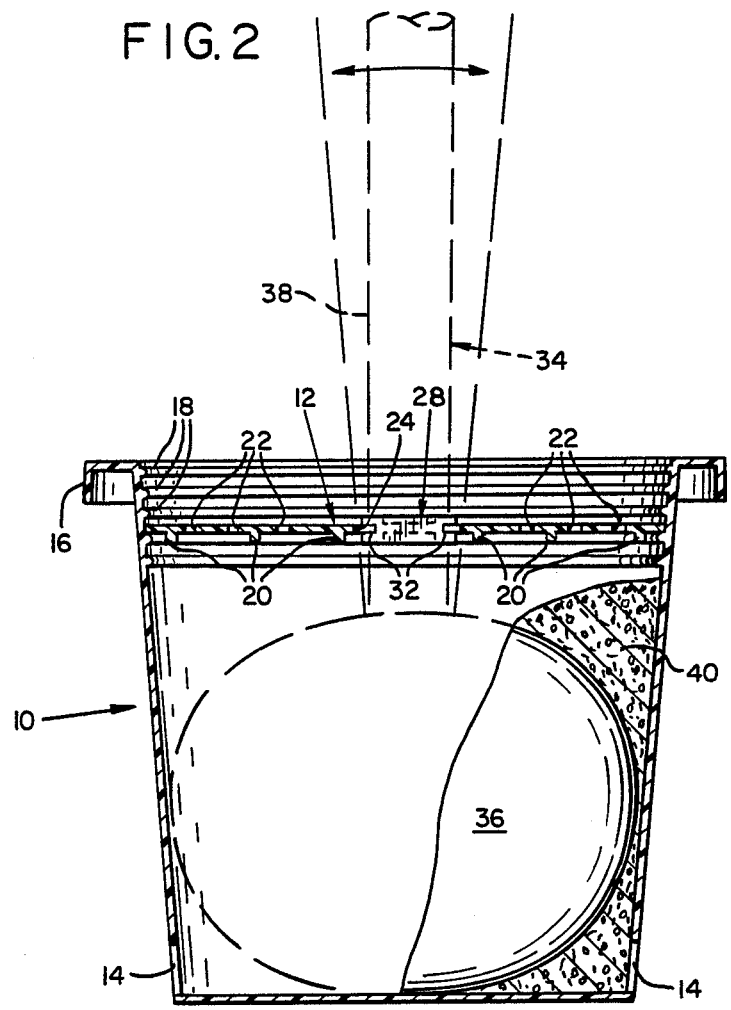
FIG. 2 is a vertical sectional view taken along line 2—2 of FIG. 1.

The latter situation is illustrated in the drawings, the plant comprising a tree 34 having balled roots 36 and a trunk 38. Sawdust 40 is packed around the ball in the manner illustrated in FIG. 2.

To containerize the tree, lid 12 is removed as shown in FIG. 3. The balled root portion of the tree then is placed in the container. Lid 12 is placed about the trunk of the tree, making use of slot 26 to introduce the trunk into the central opening 24 of the lid. Slide block 28 next is inserted in slot 26, closing the slot and making the lid uniform and continuous across its surface.

The lid 12 then is lowered and pushed into the open upper end of container 10. Thereupon the outer edge of the lid frictionally engages ribs 18 on the inner upper surface of the container.

At the same time, the lid packs the container contents; either the loose growing medium in the case of a bare root plant, or sawdust or like material in the case of a balled and burlapped plant.

The lidded container thus serves as a support for the plant, holding it erect during storage and transportation. It also compresses the growing medium about the roots of a bare root plant. This facilitates establishment of the plant in the container and prevents shaking off of the growing medium during handling and transportation.

Having thus described in detail a preferred embodiment of the present invention it will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description. All changes which come within the meaning and range of equivalency of the claims are therefore to be embraced therein.

We claim:

1. A lidded nursery plant container of the class in which large plants may be grown, stored, tranported and merchandised without removal from the container, comprising in combination:
    (a) a container for the root structure and growing medium of a plant, the container having an open top,
    (b) a plurality of substantially continuous, vertically-spaced, circumferentially-extending, friction ribs on the inner surface of the container, adjacent the open top thereof,
    (c) a lid comprising a substantially continuous sheet of substantially planar, substantially liquid-impervious, flexible plastic material capable of being pushed downwardly across the ribs to a position below one of the ribs, for closing the open top of the container and packing the growing medium of the plant into the container,
    (d) the lid having a plurality of radially spaced, concentrically arranged stiffening ribs,
    (e) the lid also having a central opening for receiving the stem of a plant, and a fixed radial slot extending from the central opening to the outer margin of the lid for passing the plant stem therethrough,
    (f) a slide block closure having grooves slidably to engage the margins of the radial slot for closing the slot, and
    (g) the container further characterized by the presence of an open top defined by a reversely bent, integral, stiffening flange spaced from the container side wall, which facilitates manual handling of the heavy, filled container.

2. The container of claim 1 wherein the lid is further characterized by the presence of a plurality of circumferentially-spaced openings through the lid for introducing irrigating liquid into the growing medium.

* * * * *